United States Patent [19]
Harnett

[11] 3,899,837
[45] Aug. 19, 1975

[54] EDUCATIONAL APPARATUS

[76] Inventor: Rodney David Harnett, 13 Kenmore Close Kew Green, Richmond, England

[22] Filed: July 10, 1973

[21] Appl. No.: 377,920

Related U.S. Application Data

[63] Continuation of Ser. No. 200,863, Nov. 22, 1971, abandoned.

[30] Foreign Application Priority Data
Nov. 27, 1970 United Kingdom............... 56409/70
Mar. 29, 1971 United Kingdom................. 8063/71

[52] U.S. Cl.................. 35/8 B; 35/8 A; 273/148 R; 273/152.2
[51] Int. Cl............................................ G09b 19/22
[58] Field of Search..................... 35/8 B, 8 A, 35 C; 273/149 P, 152.44, 152.2, 148 R

[56] References Cited
UNITED STATES PATENTS
2,051,615  8/1936  Miles............................... 273/149 P
2,908,767  10/1959  Fritzinger..................... 35/35 C UX
2,911,482  11/1959  Dostert........................... 35/35 C X
3,128,344  4/1964  Goold............................. 35/35 C X
3,177,594  4/1965  Demo................................ 35/35 C
3,271,883  9/1966  Freeman............................ 35/35 C FOREIGN PATENTS OR APPLICATIONS
535,269  4/1941  United Kingdom............ 273/152.44

Primary Examiner—Wm. H. Grieb
Attorney, Agent, or Firm—Brisebois & Kruger

[57] ABSTRACT

A record for teaching a card game comprises a common carrier having a plurality of independent but time-interrelated commentaries which in use are played back individually to the members of a group of participants to enable them to follow a prescribed game from a given starting point. Apparatus is provided to enable the desired individual playback through separate channels, and a specially marked pack of playing cards is provided to enable the arrangement of cards at the given starting point to be reproduced without reference to the face values of the cards.

2 Claims, 2 Drawing Figures

3,899,837

1

EDUCATIONAL APPARATUS

SUMMARY OF THE INVENTION

This application is a continuation of application Ser. No. 200,863, filed Nov. 22, 1971, now abandoned.

This invention relates to a method of, and apparatus for, educating persons in a situation or game.

According to the present invention a method of producing an educational or instructive record of a commentary for a plurality of participants in a situation or game comprises recording a plurality of independent commentaries, each constituted by a sequence of commentary stages, on corresponding separate tracks of a common carrier, steps being taken to ensure that the independent commentaries are mutually distributed on the carrier in such a manner that on reproduction, each commentary is reproduced exclusively on its corresponding output, with its successive commentary stages synchronising with the progress of the situation or game represented by the commentary as a whole.

The invention also includes within its scope records produced by this method.

The invention further provides apparatus for reproducing an educational or instructive commentary for a plurality of participants in a situation or game including means for reproducing simultaneously a number of independent commentaries recorded on separate tracks on a common carrier each exclusively through a corresponding personal output channel.

By "personal output" is meant an output such as an earphone or a set of headphones or the like which in use reproduces a corresponding commentary such that it is not normally possible for anyone other than the person using the personal output to receive the commentary.

In order to improve the effectiveness of instruction, a specially marked pack of playing cards has been produced which, however, may be used in circumstances other than those of the method defined above, and so in general terms the invention also provides a pack of playing cards in which pack the backs of all the cards are marked with at least one set of markings such that the marking of each card shows its initial location at the start of a given model game.

The invention will now be described in greater detail, with reference to specific examples of ways of producing recorded commentaries and of using them for educational or instructive purposes relative to the game of Bridge.

This description will be given with reference to the accompanying drawings in which.

Figure 1:
FIG. 1 is a perspective view showing four people utilizing the invention.
Figure 2:
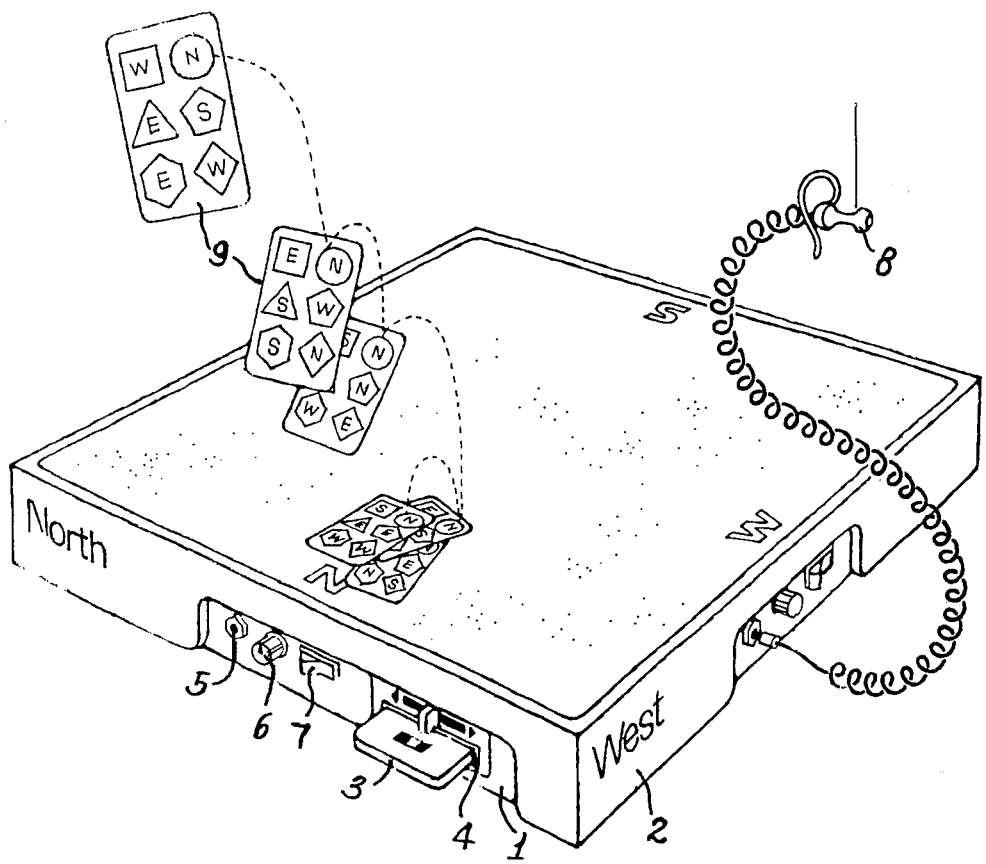
FIG. 2 is a perspective view showing in greater detail representative apparatus used to carry out the invention.

When producing a recorded commentary according to the invention, the starting point is usually a factual record of a hand of Bridge which has already been played. In a preferred procedure, the hand is played specifically for the purpose of making a commentary, the players being skilled in the game of Bridge. A factual record is kept of the playing of the hand, and when the hand is completed, the factual record is studied by the players. The method of keeping the factual record is not critical to the invention, and it may be as simple as a set of written notes, or as complex as a video-tape recording.

Each player then gives a spoken commentary, stating what action he took, and his reasons for taking that particular action. The four commentaries are then recorded separately as four corresponding tracks on a magnetic tape in such a manner that during playback the successive stages of each individual commentary synchronise with the progress of the hand represented by the commentary as a whole. This synchronisation can be achieved by using a recorded factual record which itself preserves the original inter-commentary timing, for example a video-tape recording, and recording the individual commentaries simultaneously through independent channels onto four tracks on a master tape. This, however, raises problems of editing, and it is sufficient if the individual commentaries are recorded separately, but with due regard to their relative timing, to give an equally effective end result. The master tape thus produced carries four separate commentary tracks, each commentary relating exclusively to the play of a corresponding one of the original players. Copies can be made from the master tape and it has been found convenient to produce the copies in the form of standard cassettes.

To utilise a tape produced in accordance with the method described, I provide a four-track cassette playback unit 1, in which the signals from the four tracks are reproduced through four separate outputs, each provided with an earphone. In the present example of Bridge teaching, the playback unit is housed in a shallow box-like container 2, which in plan is the same size and shape as a standard card table. Cassettes 3 may be inserted into the playback unit through a slot 4 in one side wall of the container, and the output equipment for each track, consisting of earphone connection 5, volume control 6 and switch 7, is mounted on the corresponding side wall. The tracks of the tape correspond to N, E, W and S of the original game, and the sides of the box-like container are identified accordingly.

To use the equipment in teaching the game of Bridge, four participants will use the container as a card-table, and each will use the corresponding earphone 8. Cards 9 are given to the participants so that each hand is identical to that which was held by the corresponding player in the preparation of an instructional tape, and this tape is set in the machine for playback. The use of earphones allows normal conversation and comment among the participants.

After the cards are dealt, each participant considers his hand of cards and decides what action he should take. The tape playback unit is then started and each participant receives a separate commentary explaining what action the expert player originally holding that hand took in the same situation and what the reasons were for that action. The participants take the action explained to them by the commentary. They then consider what further action to take and listen to the further commentaries. In this manner the hand is played identically to the way in which the hand was played by the expert players.

After this procedure is completed, the participants may each move around one place so that each receives a commentary different from that heard by him in the previous game and the hand is played once more, as before, except that each participant is dealt a hand corresponding to that held by a different expert player in the original game and that the commentary he hears is that recorded by that player.

Thus the hand may be played four times by the participants, each time a different part in the game being taken by each participant.

Various means can be used to stop and start the playback unit between commentary stages, or between games, if required. The simplest expedient is to record on one of the tracks a spoken instruction to stop. The corresponding player would then stop the unit, which would be re-started when all the participants were ready. However, automatic stopping means can be used. For example, strips of metal foil can be spliced into or secured onto the tape during manufacture so that, when used with a suitable playback unit the tape will stop when the foil reaches a position where it forms an electrical connection between two contacts.

This method could be used to stop the tape at selected points in the commentary to allow the participants to take the action explained to them by the commentary, and to consider the play. An alternative method of stopping the tape would be to record on to the tape a signal which could be used to operate a stopping mechanism.

The tape can be started again either manually or by an automatic mechanism which allows a predetermined length of time to pass between stopping and starting of the tape.

The examples described above have referred to a tape cassette but it will be understood that the invention is also applicable to magnetic tape used on spools as opposed to in cassettes or to any other recording medium, whether responding to and reproducing audio or visual commentaries. Furthermore, the game in which the invention educates participants need not necessarily be bridge. It can, for example, be any card game, game played with pieces on a board, business technique games, or military strategy games.

The commentaries recorded need not be spoken by the original players of the game but could be given by one or more persons who are expert at the game, or could be recorded from a reading of a written commentary of a game. Thus the game to which the commentaries relate could be one played originally some time ago, and could be, for example, a classic game played by experts who are now dead.

It is a feature of the invention described above that preset hands of cards are distributed. Obviously, this can be done with reference to the face values of the cards, but this diminishes the effect of the teaching since each player can become aware of the contents of the hands of the other players. This can be avoided by the use of a pack of cards marked in accordance with the invention in such a manner that they can be dealt without revealing their face values.

By way of example, it may be desired to provide a pack of cards suitable for playing a predetermined game in conjunction with a pre-recorded cassette of tape as described above. It is proposed, therefore, that the cassette is identified by a coloured motif, such as a green circle. The backs of the cards of the corresponding pack will then carry a green circle, and within this circle each card will carry one of the letters N, E, S and W corresponding to the north, east, south and west positions at Bridge. The marks will obviously be such as to re-construct the hands originally dealt when the recording was made.

The pack can be adapted for use with further cassettes by providing further sets of marks, for example, a second set disposed within a red circle corresponding to a game recorded on a tape in a cassette coloured by a red circle, a third set identified by a blue circle, and so on.

Although the invention has been described with reference to the teaching of Bridge, it is obviously possible to employ it in the teaching of any other card game. Further, although reference has been made to the dealing of hands, it is clear that the markings may be adapted to define other locations than specific playing positions, for example a stock of cards could be identified by a distinctive marking accompanied by a digit or digits indicating the position of a particular card in the stock.

It will be seen from the above description that the present invention is of broad application, and enables playing cards or similar articles to be sorted without revealing their face values.

What is claimed is:

1. Bridge teaching apparatus comprising in combination:
    a four-sided card table providing the North, South, East and West playing positions required in the game of Bridge;
    a pack of playing cards having the usual suit and value markings on the faces thereof and, on their backs, deal marks dividing the pack into four hands, North, South, East and West by indicating to which of said playing positions each card is to be dealt;
    a four-track tape recording having mutually isolated North, South, East and West commentaries in parallel thereon, correlated with said pack by having said commentaries corresponding to a game of Bridge played with said pack dealt according to said deal marks;
    four-track tape playback means mounted on said table for playing said recording to provide mutually isolated parallel playbacks of said commentaries;
    four separate personal sound transducers, North, South East and West, each provided at a respective one of said playing positions; and
    four separate signal paths connected from said tape playback means to respective ones of said sound transducers, whereby said North commentary is hearable only in said North transducer, said South commentary is hearable only in said South transducer, said East commentary is hearable only in said East transducer, and said West commentary is hearable only in said West transducer.

2. Bridge teaching apparatus as set forth in claim 1, which further comprises four separate loudness controls, each mounted on a respective side of said table and connected in circuit with said tape playback means to control the loudness of sound in the corresponding transducer.

* * * * *